United States Patent [19]

Petruchik

[11] Patent Number: 5,627,615
[45] Date of Patent: May 6, 1997

[54] WATER-RESISTANT CAMERA ASSEMBLY

[75] Inventor: Dwight J. Petruchik, Honeoye Falls, N.Y.

[73] Assignee: Eastman Kodak Company, Rochester, N.Y.

[21] Appl. No.: 378,208

[22] Filed: Jan. 25, 1995

[51] Int. Cl.⁶ .................................................. G03B 29/00
[52] U.S. Cl. ............................................................ 396/25
[58] Field of Search ................................. 354/64, 288, 62; D16/204; D3/3

[56]  References Cited

U.S. PATENT DOCUMENTS

| | | | |
|---|---|---|---|
| D. 334,397 | 3/1993 | Kohno et al. | D16/204 |
| D. 338,330 | 8/1993 | Kohno et al. | D3/33 |
| 3,162,106 | 12/1964 | De Wouters et al. | 354/64 |
| 4,803,504 | 2/1989 | Maeno et al. | 354/64 |
| 4,882,600 | 11/1989 | Van de Moere | 354/64 |
| 5,177,515 | 1/1993 | Tsukamoto | 354/64 |
| 5,285,894 | 2/1994 | Kamata et al. | 354/64 X |
| 5,305,032 | 4/1994 | Arai | 354/64 |

*Primary Examiner*—D. Rutledge
*Attorney, Agent, or Firm*—Roger A. Fields

[57] ABSTRACT

A water-resistant camera assembly comprising a camera body in which a light-sensitive film is to be exposed, and a water-resistant casing enclosing the camera body, is characterized in that the water-resistant casing and the camera body together have a common casing section and the water-resistant casing has an independent casing section which fits over the camera body and connects with the common casing section to complete the water-resistant casing.

6 Claims, 4 Drawing Sheets

WATER-RESISTANT CAMERA ASSEMBLY

FIELD OF THE INVENTION

The invention relates generally to the field of photography, and in particular to a water-resistant camera assembly.

BACKGROUND OF THE INVENTION

The most widely used water-resistant camera assembly comprises a camera body with an interior in which a light-sensitive film is to be exposed, and a water-resistant casing enclosing the camera body. The water-resistant casing usually is a rigid transparent box.

As disclosed in prior art U.S. Pat. No. 5,285,894, issued Feb. 15, 1994, the transparent box may comprise a substantially flat bottom section on which the camera body sits and a separate main section which fits over the camera body and connects with the bottom section to form a water-resistant enclosure.

SUMMARY OF THE INVENTION

A water-resistant camera assembly comprising a camera body with an interior in which a light-sensitive film is to be exposed, and a water-resistant casing enclosing the camera body, is characterized in that:

the camera body has an opening to its interior; and the water-resistant casing has one casing section which is joined with the camera body over the opening to form an enclosure with the camera body and has another casing section which fits over the camera body and connects with the one casing section to complete the water-resistant casing.

Stated in other words, the water-resistant casing and the camera body together have a common casing section, and the water-resistant casing has an independent casing section which fits over the camera body and connects with the common casing section to complete the water-resistant casing.

Accordingly, an economy of parts is achieved as compared to prior art U.S. Pat. No. 5,285,894.

DETAILED DESCRIPTION OF THE INVENTION

The invention is disclosed as being embodied in a water-resistant camera assembly. Because the features of a water-resistant camera assembly are generally known, as exemplified by prior art U.S. Pat. No. Des. 321,704, issued Nov. 19, 1991, and U.S. Pat. No. 5,126,772, issued Jun. 30, 1992, the description which follows is directed in particular only to those elements forming part of or cooperating directly with the disclosed embodiment. It is to be understood, however, that other elements may take various forms known to a person of ordinary skill in the art.

Figure 1:
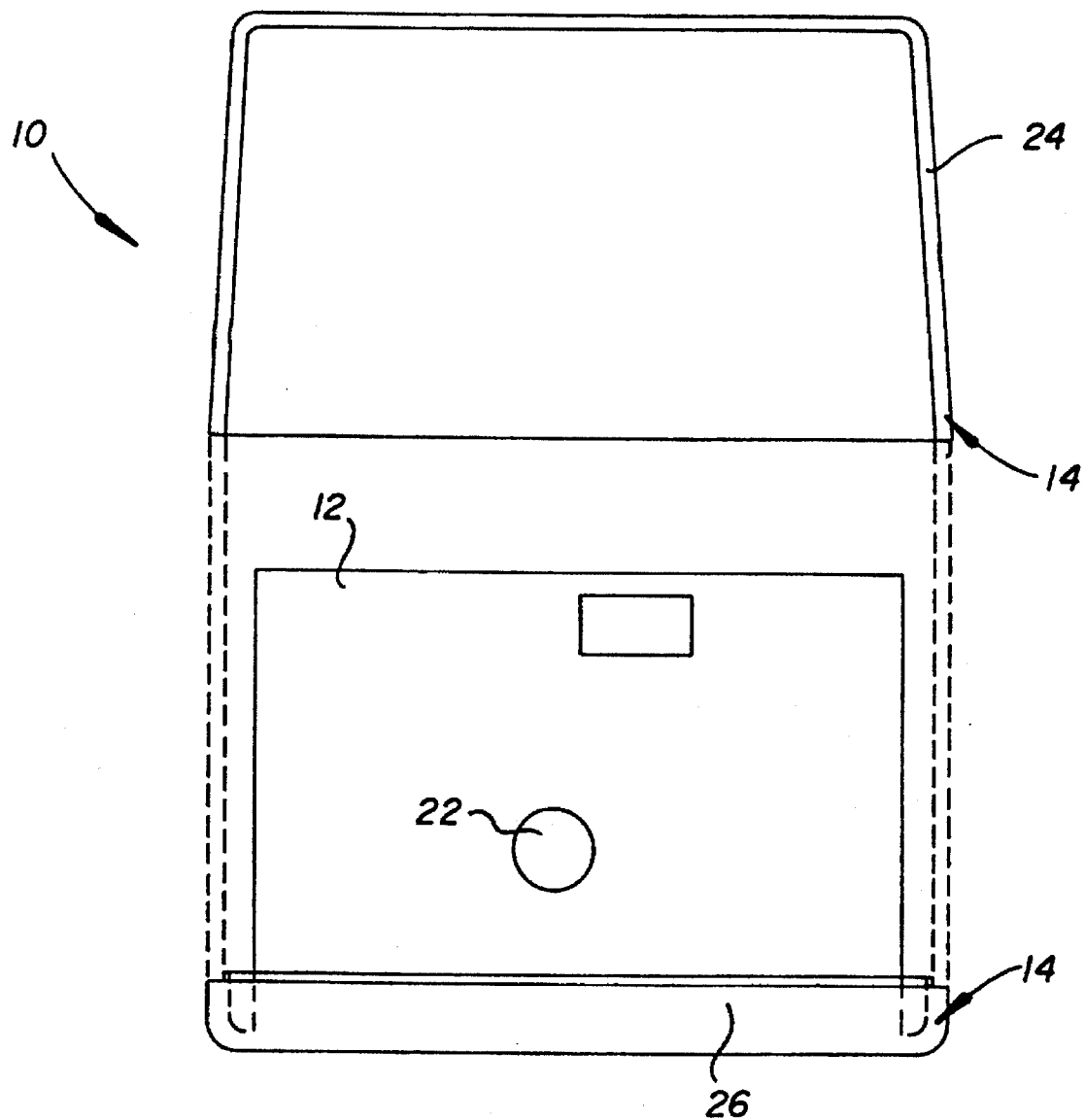
FIG. 1 is a front elevation view of a water-resistant camera assembly shown unassembled according to a preferred embodiment of the invention.
Figure 2:
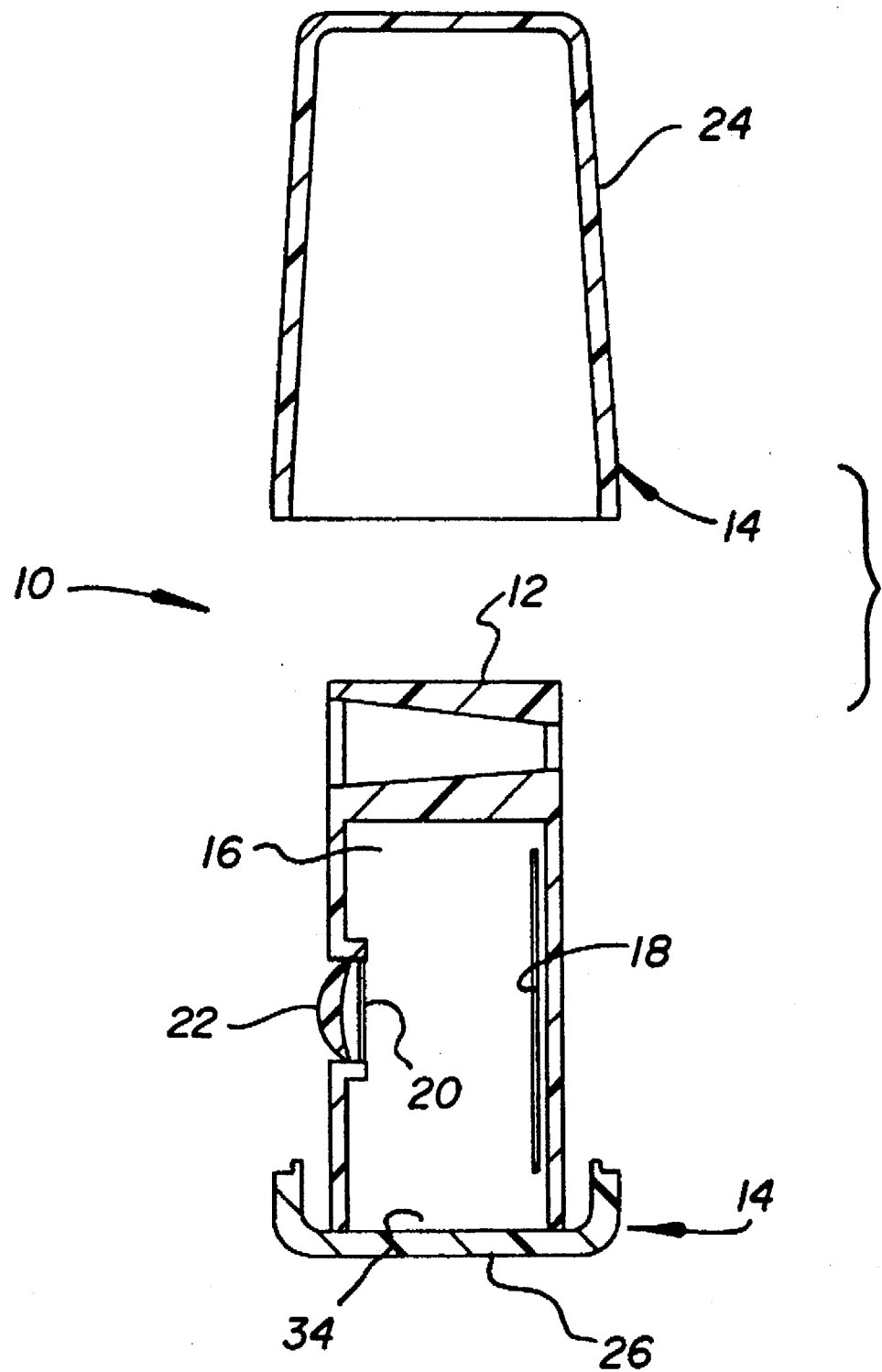
FIG. 2 is a cross-section view of the water-resistant camera assembly as shown in FIG. 1.
Figure 3:
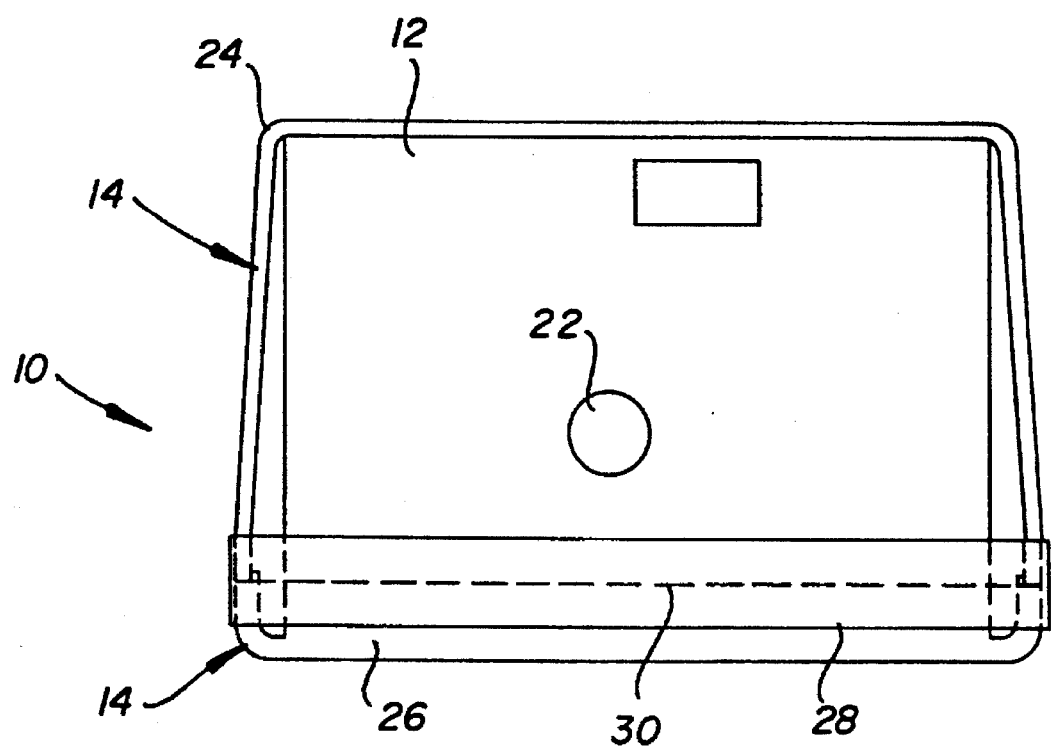
FIG. 3 is a front elevation view of the water-resistant camera assembly shown assembled.

Referring now to the drawings, FIGS. 1–3 show a water-resistant camera assembly 10 comprising an opaque camera body 12, such as for the single-use camera disclosed in U.S. Pat. No. 5,126,772, and a water-resistant casing 14 for enclosing the camera body. The camera body 12 has an interior 16 in which a light-sensitive film 18 is to be exposed when a light-blocking shutter 20 is momentarily removed from behind a taking lens 22. See FIG. 2.

Figure 4:
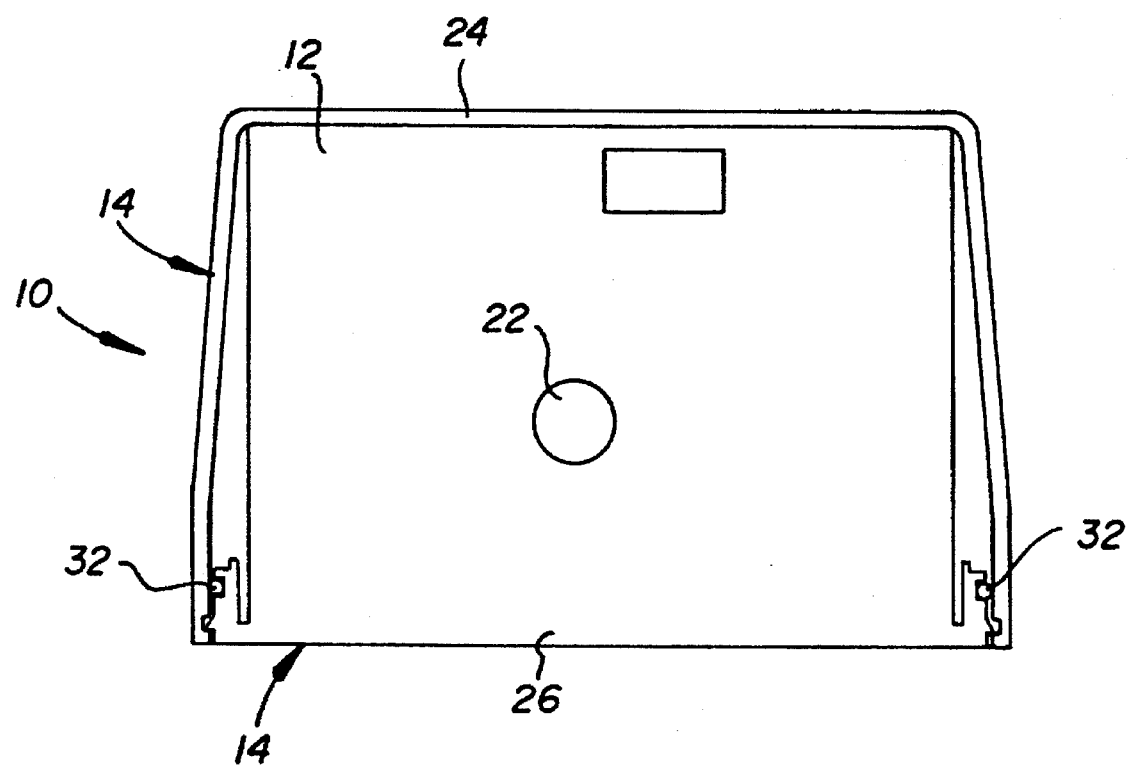
FIG. 4 is a front elevation view of the water-resistant camera assembly shown assembled according to an alternate embodiment.

The water-resistant casing 14 consists of a transparent large-volume casing section 24 and an opaque small-volume casing section 26. The large-volume casing section 24 is intended to fit over the camera body 12 and connect with the small-volume casing section 26 to complete the water-resistant casing 14. As shown in FIG. 3, a waterproof band 28 is adhered to the water-resistant casing 14 over a seam 30 between the large-volume and small-volume casing sections 24 and 26. Alternatively, a rubber o-ring 32 can be used in place of the band 28 as illustrated in the variant of the water-resistant camera assembly 10 shown in FIG. 4.

The small-volume casing section 26 is joined with the camera body 12 over a bottom opening 34 of the camera body, as shown in FIG. 2, to make the smaller-volume casing section and the camera body form a single-piece light-tight unitary enclosure for the film 18. Thus, the water-resistant casing 14 and the camera body 12 share a common, i.e. the same, bottom portion, which is the small-volume casing section 26.

The invention has been described with reference to a preferred embodiment. However, it will be appreciated that variations and modifications can be effected by a person of ordinary skill in the art without departing from the scope of the invention.

PARTS LIST 10. water-resistant camera assembly
12. camera body
14. water-resistant casing
16. interior
18. film
20. shutter
22. lens
24. large-volume casing section
26. small-volume casing section
28. waterproof band
30. seam
32. o-ring
34. bottom opening

I claim:

1. A water-resistant camera assembly comprising a camera body with an interior in which a light-sensitive film is to be exposed, and a water-resistant casing enclosing said camera body, is characterized in that:

said camera body has an opening to its interior; and said water-resistant casing has one casing section which is joined with said camera body over said opening to form an enclosure with the camera body and has another casing section which fits over the camera body and connects with said one casing section to complete the water-resistant casing.

2. A water-resistant camera assembly as recited in claim 1, wherein said one casing section is opaque and said other casing section is transparent.

3. A water-resistant camera assembly as recited in claim 1, wherein said camera body and said one casing section are opaque to make said enclosure light-tight.

4. A water-resistant camera assembly as recited in claim 1, wherein said camera body and said one casing section are a single piece to make said enclosure unitary.

5. A water-resistant camera assembly comprising a camera body in which a light-sensitive film is to be exposed, and a water-resistant casing enclosing said camera body, is characterized in that:

said water-resistant casing and said camera body together have a common casing section;

said water-resistant casing has an independent casing section which fits over the camera body and connects with said common casing section to complete the water-resistant casing; and said common casing section is a common bottom portion of said camera body and said water-resistant casing.

6. A water-resistant camera assembly comprising a camera body in which a light-sensitive film is to be exposed, and a water-resistant casing, is characterized in that:

said water-resistant casing and said camera body together have a common casing section integral with and belonging equally to the water-resistant casing and the camera body which but for said common casing section would leave a common void in the water-resistant casing and the camera body; and said water-resistant casing has an independent casing section which connects with said common casing section to complete the water-resistant casing.

* * * * *